United States Patent [19]

Kanno et al.

[11] Patent Number: 4,724,816

[45] Date of Patent: Feb. 16, 1988

[54] FUEL CONTROL DEVICE FOR INTERNAL COMBUSTION ENGINE

[75] Inventors: Yoshiaki Kanno; Katsuya Nakamoto; Jiro Sumitani, all of Himeji, Japan

[73] Assignee: Mitsubishi Denki Kabushiki Kaisha, Tokyo, Japan

[21] Appl. No.: 43,728

[22] Filed: Apr. 29, 1987

[30] Foreign Application Priority Data

Apr. 29, 1986 [JP] Japan .................................. 61-100056

[51] Int. Cl.⁴ ........................ F02D 41/06; F02D 41/02
[52] U.S. Cl. .................................... 123/491; 123/478; 123/490
[58] Field of Search ............... 123/179 G, 179 L, 478, 123/480, 490, 491, 492; 364/431.1

[56] References Cited

U.S. PATENT DOCUMENTS

| | | | |
|---|---|---|---|
| 3,654,905 | 4/1972 | Mennesson | 123/490 |
| 3,747,575 | 7/1973 | Eisele et al. | 123/492 X |
| 4,069,795 | 1/1978 | Long et al. | 123/491 |
| 4,096,831 | 6/1978 | Gunda | 123/491 X |
| 4,200,063 | 4/1980 | Bowler | 123/478 |
| 4,242,992 | 1/1981 | Kawamura et al. | 123/491 |
| 4,437,446 | 3/1984 | Isomura et al. | 123/492 |
| 4,457,282 | 7/1984 | Muramatsu et al. | 123/492 X |

Primary Examiner—Tony M. Argenbright
Attorney, Agent, or Firm—Sughrue, Mion, Zinn, Macpeak and Seas

[57] ABSTRACT

Each of fuel injectors associated with respective cylinders of an internal combustion engine is driven several times for each air-intake with narrow drive pulses during the engine at low temperature is in a starting stage.

2 Claims, 10 Drawing Figures

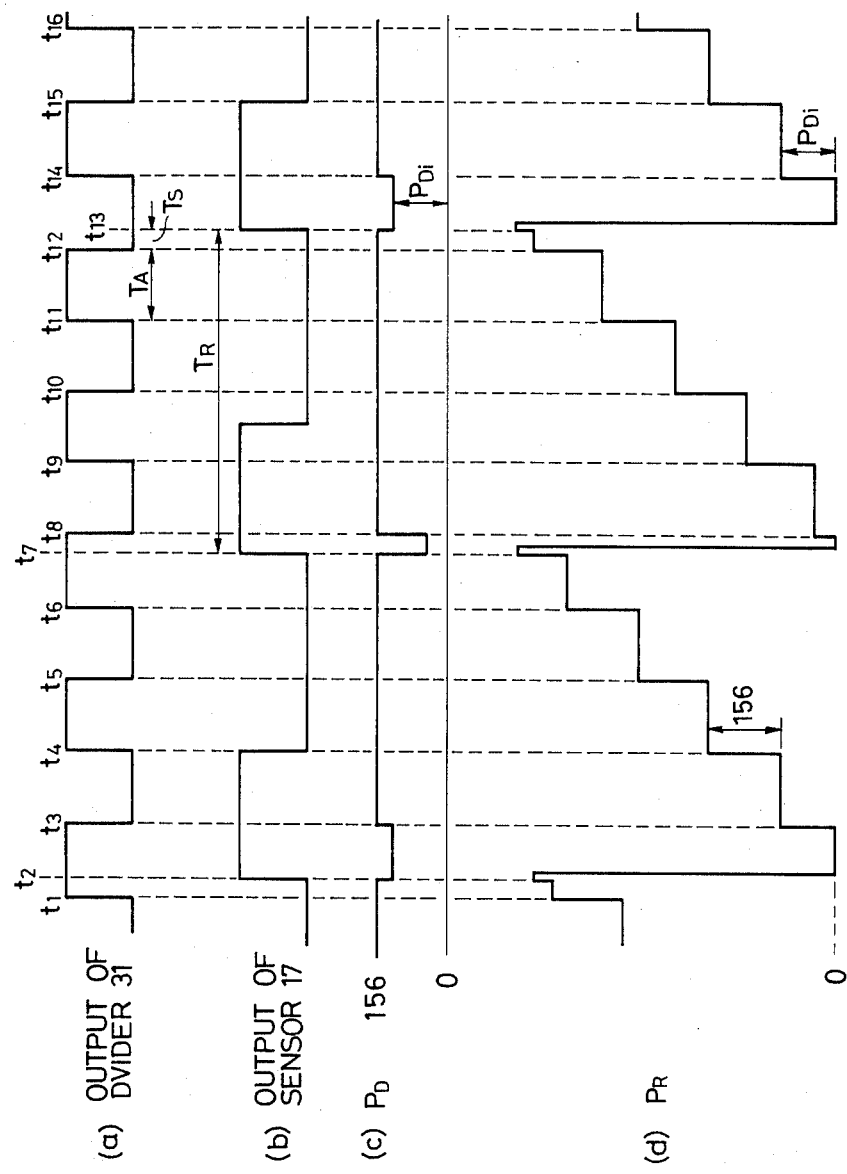

FUEL CONTROL DEVICE FOR INTERNAL COMBUSTION ENGINE

BACKGROUND OF THE INVENTION

The present invention relates to a fuel injection control for internal combustion engine.

As a conventional fuel injection control for internal combustion engine, the so-called "multi-point system" in which a fuel injector is provided for each cylinder is generally used and the fuel injectors for respective cylinders are actuated according to predetermined crank angles to inject fuel sequentially is generally used. This system makes it possible to make a width range of pulse for driving the injectors wide and to thereby facilitate an air-fuel ratio control.

In such conventional system, however, the width of pulse for driving the injectors for, for example, a 4-cycle, 2-liter engine, may be around 15 m sec at a heavy load under a complete idling condition and around 200 m sec during a starting period of the engine at a very low temperature. Therefore, a large dynamic range of drive time is required and a control device for controlling such large dynamic range must have a complicated and expensive construction due to the fact that a timer thereof must have a large number of bits, etc.

SUMMARY OF THE INVENTION

An object of the present invention is to provide a fuel control system for internal combustion engine, which has a simplified and inexpensive construction.

According to the present invention, the above object can be achieved by driving fuel injectors a plurality of times per air-intake operation with pulses each having a width smaller than that of injector driving pulse at start time of an engine at low temperature. That is, in the present invention each fuel injector is driven once for each air-intake period during a normal engine operation and, when the pulse width is larger in such a time as when the engine at low temperature is started, each fuel injector is driven several times for each air-intake period with pulses each having a smaller width than the latter pulse.

BRIEF DESCRIPTION OF THE DRAWINGS

FIG. 8 is a timing chart of the flow chart in FIGS. 6, 7A and 7B.

DESCRIPTION OF THE PREFERRED EMBODIMENT

Figure 1:
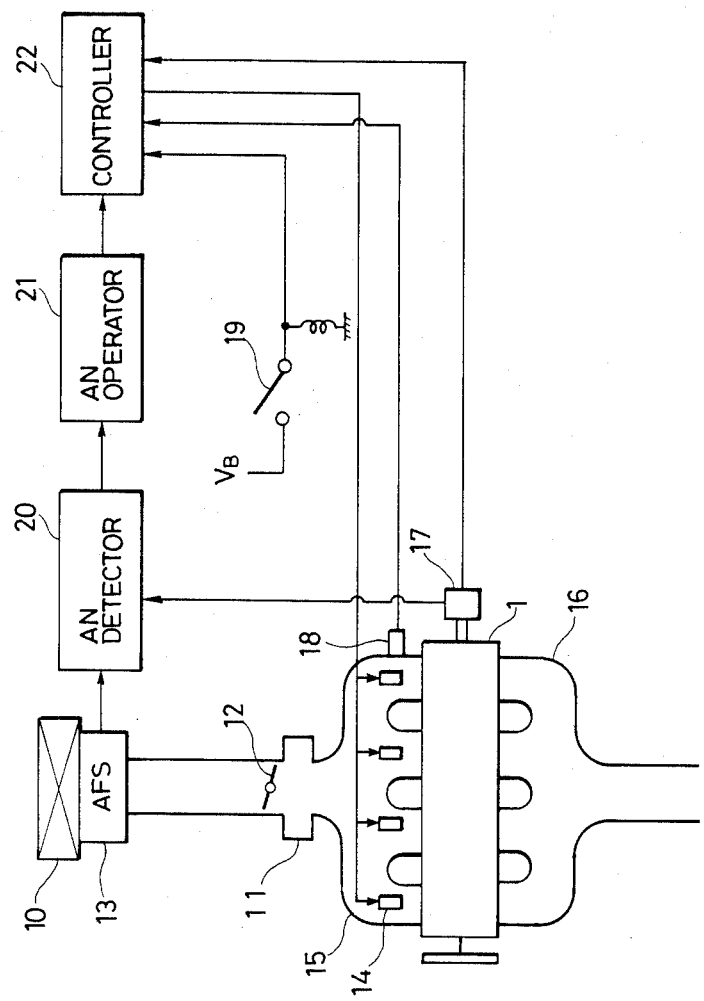
FIG. 1 shows schematically, a construction of a fuel control device according to an embodiment of the present invention.

In FIG. 1 which shows a construction of a fuel control device according to the present invention, an internal combustion engine is associated with an air cleaner 10, a surge tank 11, a throttle valve 12, a Kalman type air-flow sensor (AFS) 13, fuel injectors 14 each for one of cylinders of the engine 1, a suction pipe 15, an exhaust pipe 16, a crank angle sensor 17, a water temperature sensor 18 and an ignition switch 19. The AFS 13 responds to an intake air flow for producing pulses the number of which indicates an amount of air and the crank angle sensor 17 responds to an engine revolution for producing an SGT (representative of crank angle) pulse, in this case, a crank angle from a leading edge to a trailing edge of the pulse being 180°, and produces an SGC signal (cylinder identifying code signal) which is high during a compression stroke of, for example, a first cylinder. An AN detector 20 responds to outputs of the AFS 13 and the crank angle sensor 17 to count the output pulses from the AFS 13 fallen within a predetermined crank angle of the engine 1. An AN operation means 21 receives an output of the AN detector 20 and operates the following equation to obtain an amount of air intake of the engine 1 up to a time instance t:

$$AN_{(t)} = K_1 \cdot AN_{(t-1)} + (1-K_1) \cdot P_R \qquad (1)$$

where $AN_{(t-1)}$ is the number of output pulses of the AFS 13 which corresponds to a possible amount of intake air of the engine 1 up to the SGT pulse at a time instance $t-1$ and $P_R$ is the output of the AN detecter 20 within a time period from $(t-1)$ to t.

The control device 22 receives the outputs of the AN operation device 21, the crank angle sensor 17, the water temperature sensor 18 such as thermister for detecting a coolant temperature of the engine 1 and an output of a starter switch 19 for snesing an engine starting state to control a driving time of the injectors 14 correspondingly to the air intake amount of the engine 1 to thereby control an amount of fuel to be supplied to the engine 1.

Figure 2:
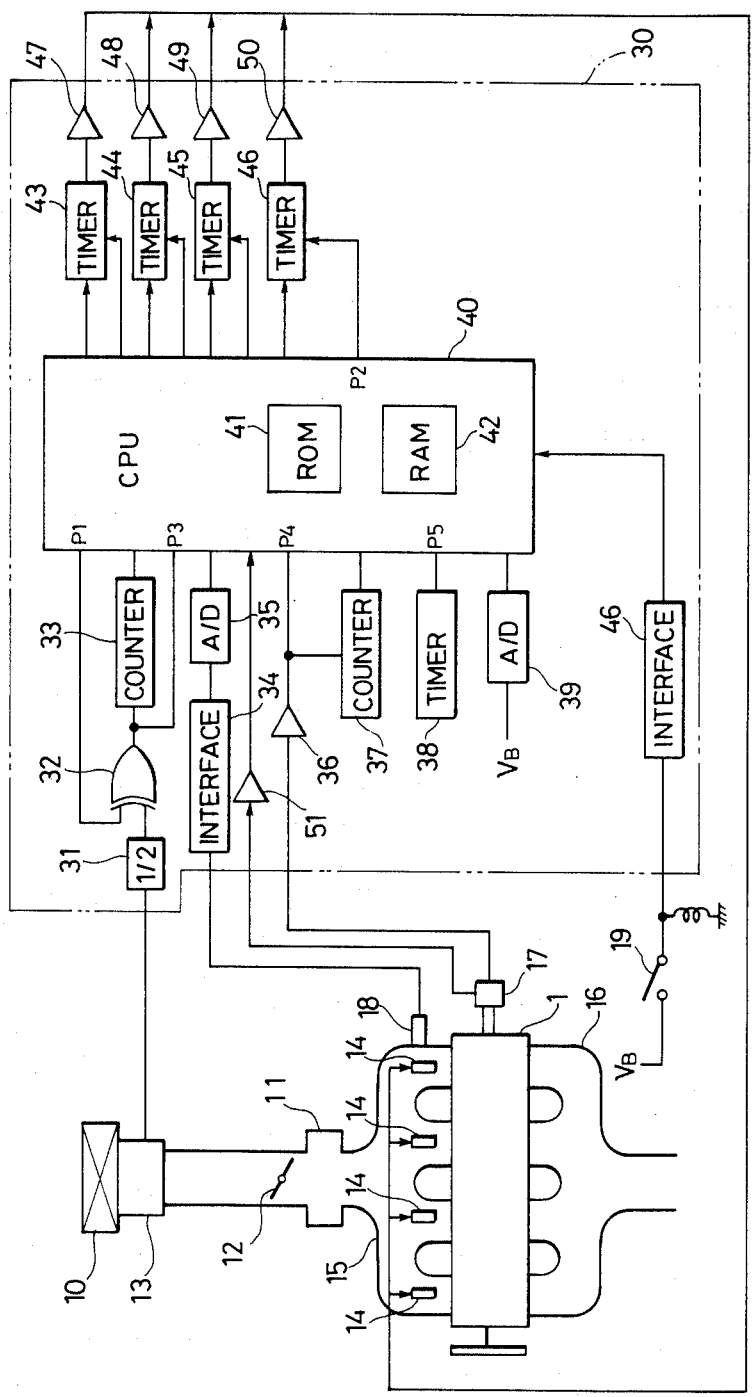
FIG. 2 is a detailed circuit diagram of an example of the construction shown in FIG. 2.

FIG. 2 shows the emobdiment in FIG. 1 in more detail, in which a controller 30 receives the outputs of the AFS 13, the crank angle sensor 17, the temperature sensor 18 and the starter switch 19 to control the four injectors 14 provided for the four cylinders of the engine, respectively. The controller 30 corresponds to a combination of the AN detecter 20, the AN operation circuit 21 and the control device 22 and comprises a microcomputer (CPU) 40 including an ROM 41 and an RAM 42. A divide-by-2 frequency divider 31 has an input connected to the output of the AFS 13 and an exclusive OR gate 32 has one input connected to an output of the divider 31, the other input connected to an input $P_1$ of the CPU 40 and an output connected to a counter 33 and to an input $P_3$ of the CPU 40. An interface 34 is connected between the temperature sensor 18 and an analog to digital (A/D) converter 35. The controller 30 further includes a wave-shaper 36 which receives the SGT output of the crank angle sensor 17 and provides an output to be supplied to an interrupt input $P_4$ of the CPU 40 and to the counter 33, another wave-shaper 51 which receives the SGC output of the crank angle sensor 17 and provides an output to be supplied to a port of the CPU 40. The starter switch 19 is connected through an interface 46 to another port of the CPU 40. The controller 30 further includes a timer 38 connected to an interrupt input $P_5$ of the CPU 40, an A/D converter 39 for converting a battery voltage $V_B$ into a digital value and timers 43 to 46 provided between the CPU 40 and drivers 47 to 50, respectively. Outputs of the drivers 47 to 50 are commonly connected to the injectors 14.

In operation, the output of the AFS 13 is frequency-divided by 2 by the frequency divider 31 and supplied through a gate 32 which is controlled by the CPU 40 to the counter 33 which measures a time period between trailing edges of the outputs of the gate 32. The CPU 40 is supplied at its interrupt input $P_3$ with the trailing edge of the output of the gate 32 so that it is interrupted every or every half of output pulse period of the AFS 13 to measure the period of the counter 33. The output of the temperature sensor 18 is converted by the interface 34 into a voltage which is converted by the A/D converter 35 into a digital value every predetermined time, which is supplied to the CPU 40. The SGT output of the crank angle sensor 17 is supplied through the wave-shaper 36 to the interrupt input $P_4$ of the CPU 40 and to the counter 37. The CPU 40 performs an interrupt operation every leading edge of the SGT output of the crank angle sensor 17 to detect a period between adjacent leading edges of the SGT output from the counter 37. The CPU 40 also checks the SGC signal of the crank angle sensor 17 every leading edge of the SGT signal to detect the compression stroke of the first cylinder. The CPU 40 judges the starter switch 19 as being on when the output of the interface 46 is high (H). The time 38 produces an interrupt signal every predetermined time, which is supplied to the interrupt input $P_5$ of the CPU 40. The A/D converter 39 converts the battery voltage into a digital value and the CPU 40 takes a battery voltage data in every predetermined time. The timers 43 to 46 are preset by the CPU 40 and are triggered by an output port $P_2$ of the CPU 40 to provide pulses of a predetermined width which drive the injectors 14 thorugh the drivers 47 to 50.

The operation of the CPU 40 will be described with reference to flow-charts shown in FIGS. 4, 6, 7A and 7B.

Figure 4:
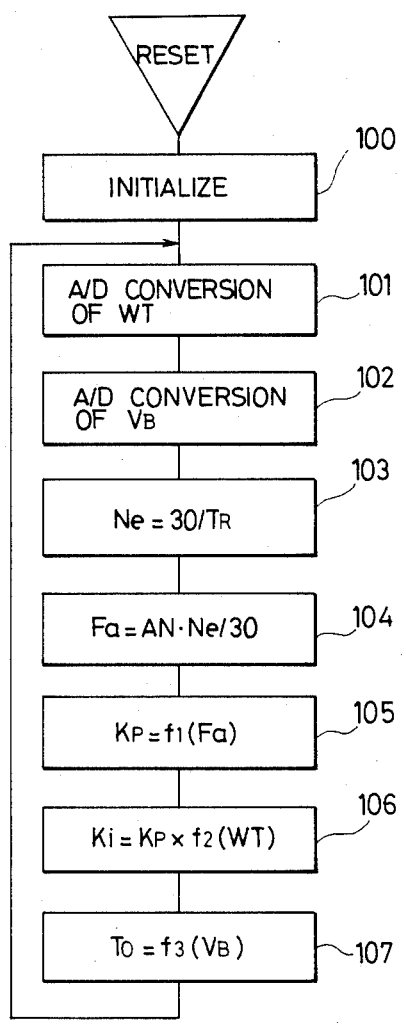
FIG. 4 is a flow chart showing an operation of the fuel control device according to the embodiment shown in FIGS. 1 to 3.
Figure 5:
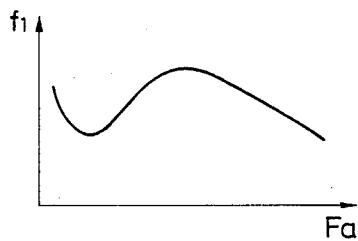
FIG. 5 is a graph showing a relation between an AFS output fregrancy of the fuel control device and a reference drive time convension coefficient.

FIG. 4 is a main program of the CPU 40. When a reset signal is inputted to the CPU 40, the RAM 42 and input/output ports are initialized at step 100. The output of the water temperature sensor 18 is analog/digital converted at step 101 and the latter is stored in the RAM 42 as WT. At step 102, the battery voltage is A/D converted, which is stored in the RAM 42 as VB. At step 103, an operation of $30/T_R$ is performed where $T_r$ is a period of the crank angle sensor 17 to calculate the revolution number $N_e$ of the engine. Then, at step 104, an operation of $Fa=AN \cdot N_e/30$ is performed according to a load data AN to be described later and the revolution number $N_e$ to obtain an output frequency $F_a$ of the AFS 13. At step 105, a fundamental drive time conversion coefficient $K_p$ is calculated as a function $f_1$ of the output frequency $F_a$, the function $f_1$ being shown in FIG. 5. The drive time conversion coefficient $K_p$ is corrected by the water temperature data WT at step 106 and the corrected drive time conversion coefficient $K_1$ is stored in the RAM 42. A data table $f_3$ preliminarily stored in the ROM 41 is mapped by the battery voltage data VB at step 107 to calculate a redundant time $T_D$ which is stored in the RAM 42. Thereafter, the operation from the step 101 to the step 107 is repeated.

Figure 6:
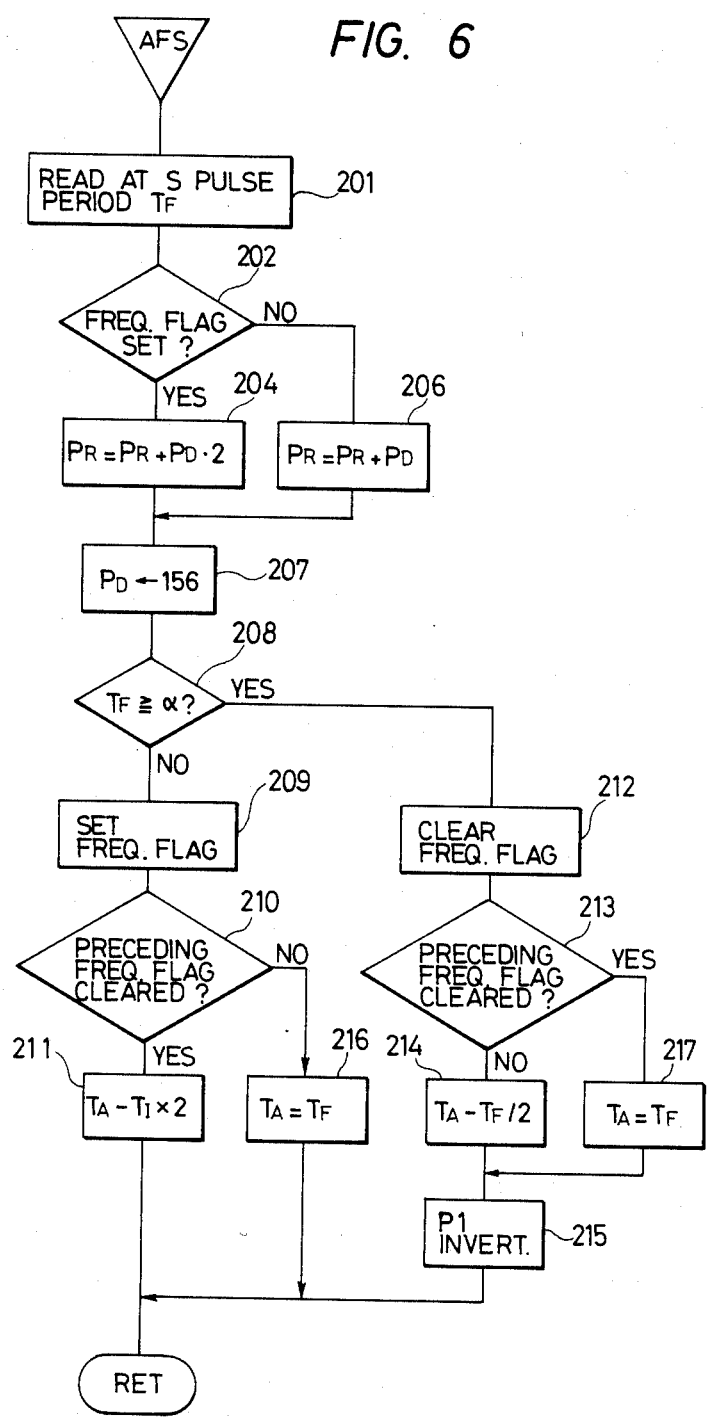
FIGS. 6, 7A and 7B are other flow charts showing the operation of the present fuel control device.

FIG. 6 shows an interrupt operation for the interrupt input $P_3$, i.e., the output signal of the AFS 13. At step 201, an output $T_F$ of the counter 33 is detected to clear the latter. The output $T_F$ is a period between leading edges of the gate 32. At step 202, it is checked whether or not a frequency division flag is set in the RAM 42. If it is set, an accumulation pulse data $P_R$ is added by $2P_D$ to update the $P_R$ at step 204. The pulse data $P_R$ is obtained by accumulating pulses each supplied from the AFS 13 within a time between adjacent leading edges of the outputs of the crank angle sensor 17. It should be noted at this time that each output pulse from the crank angle sensor 17 is made correspondent to 156 pulses in order to maintain an accuracy of operation in the CPU 40. When the frequency division flag is determined as being reset at step 202, the accumulation pulse data $P_R$ is added to the remaining pulse data $P_D$ at step 206. Then, at step 207, the remaining pulse data $P_D$ is set as 156. Then, it is checked at step 208 whether or not $T_F \geq \alpha$ where $\alpha$ is 2 m sec. when the frequency division flag is reset or $\alpha$ is 4 m sec. when the flag is set. If affirmative, the operation is shifted to step 212. If negative, it is shifted to step 209, in which, when the output frequency of the AFS 13 is not lower than 500 Hz, the frequency division flag is set.

When the preceding frequency division flag is cleared in step 210, the operation is shifted to step 211 and, when it is set in step 210, the operation is shifted to step 216. In step 211, the current AFS pulse period $T_F$ is divided by 2 and the result is stored in TA of the RAM 42. In step 216, the $T_F$ is stored in the TA completing an interrupt operation.

In step 212, the frequency division flag is cleared and, if the preceding frequency division flag is set in step 213, the operation is shifted to step 214. If the flag is reset in the step 213, the operation is shifted to step 217. In step 214, the current AFS pulse period $T_F$ is divided by 2 and the result is stored in the TA of the RAM 42. In step 217, the $T_F$ is stored in the TA and in step 215 the $P_1$ is inverted completing an interrupt operation.

Therefore, in the case of the operation at step 209, a signal is inputted to the interrupt input $P_3$ at a timing corresponding to a half of the output pulse frequency of the AFS 13 and, in the case of the operation at the step 212, a signal is inputted to the interrupt input $P_3$ at a timing corresponding to the output pulse frequency of the AFS 13.

Figure 7A:
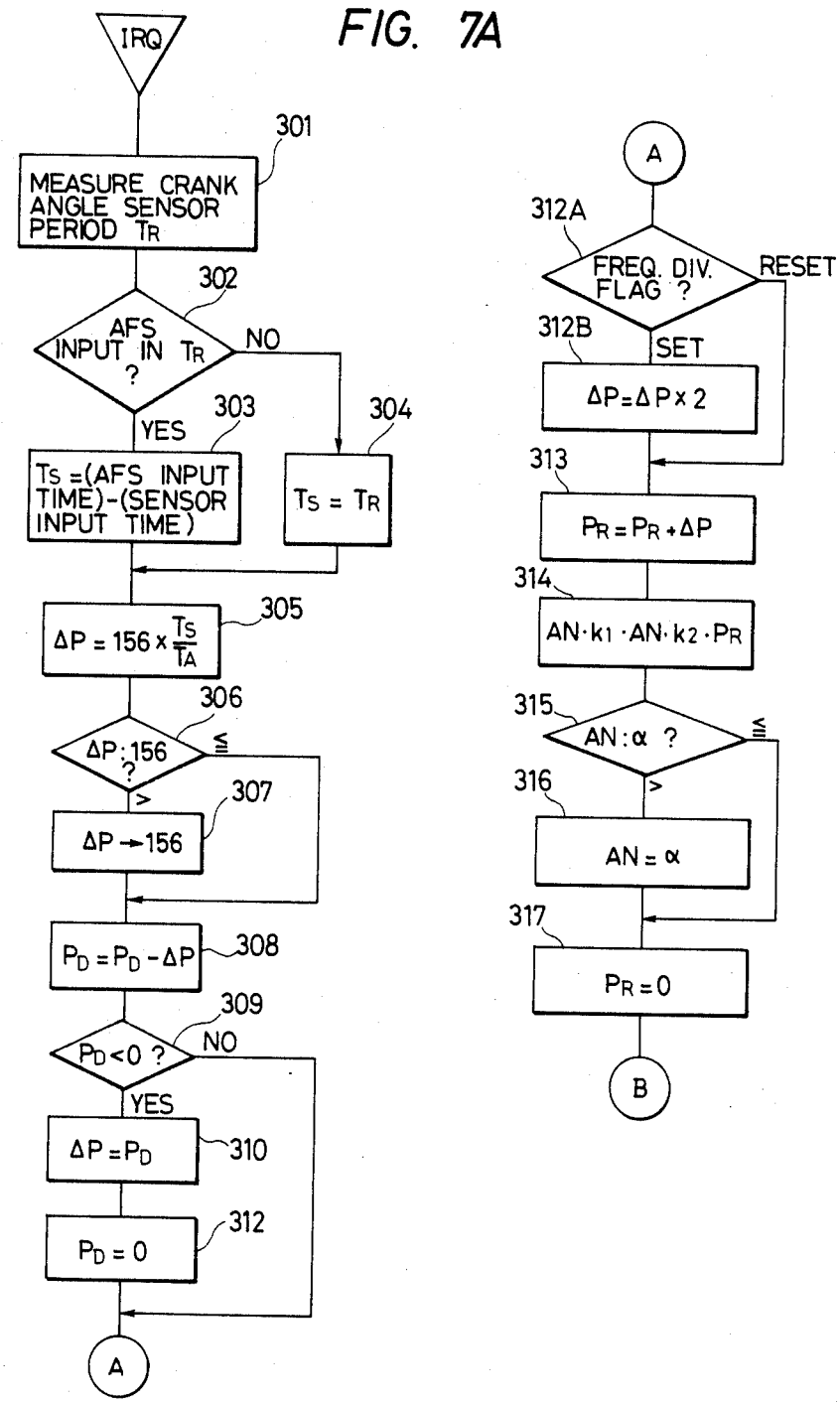
Figure 7B:
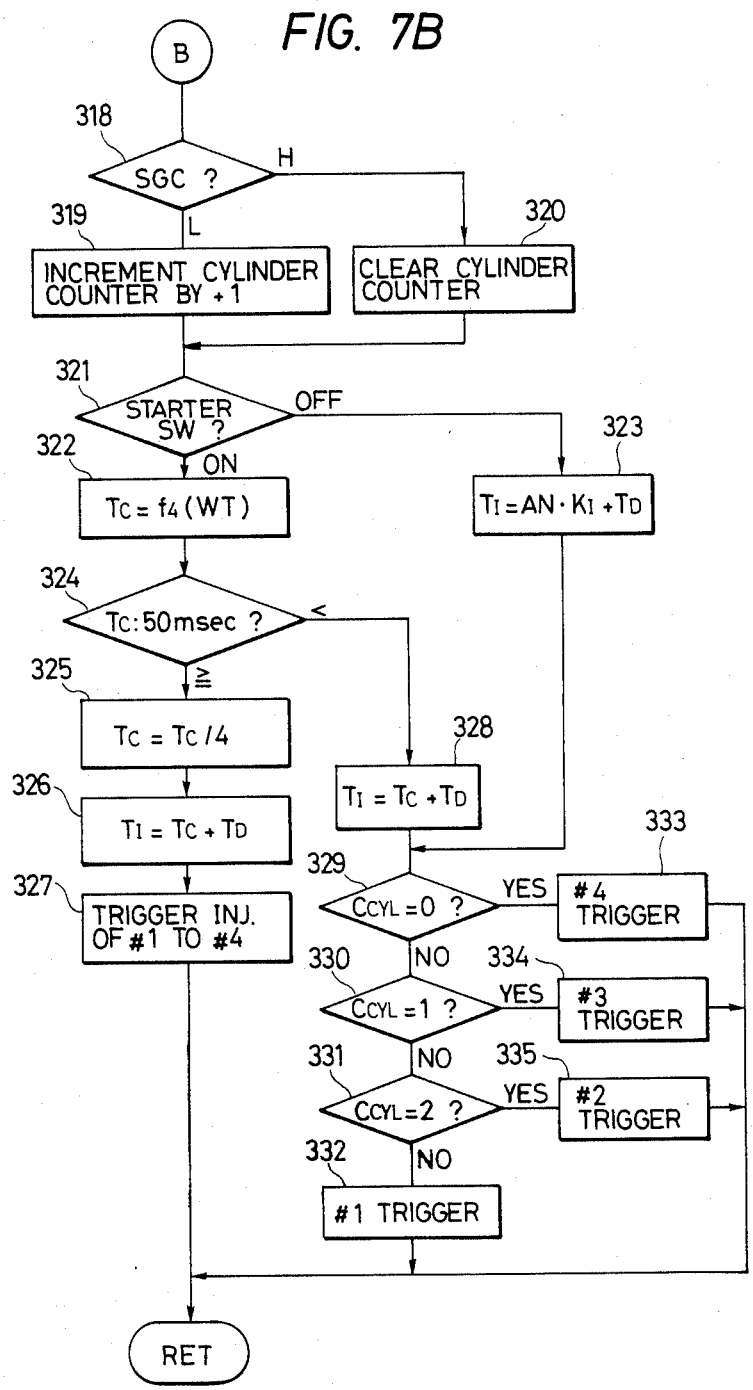

FIGS. 7A and 7B are a flow chart showing an interrupt operation when an interrupt signal is generated at the interrupt input $P_4$ of the CPU 40 due to an output of the crank angle sensor 17. In FIG. 7A, at step 301, a period between adjacent leading edges of the output pulses from the crank angle sensor 17 is readin in the counter 37 which is stored in the RAM 42 as the period $T_R$ and then the counter 37 is cleared. At step 302, it is checked whether or not there is output pulse of the AFS 13 within the period $T_R$. When affirmative, a time difference $\Delta t = t_{02} - t_{01}$ is calculated at step 303 where $t_{01}$ is a time at which a preceding output pulse is provided by the AFS 13 and $t_{02}$ is the current interrupt time instance of the crank angle sensor 17. The time difference $\Delta t$ is put as a period $T_S$. When there is no output pulse of the AFS 13 within the period $T_R$, the period $T_R$ is made correspondent to the period $T_S$, at step 304. When there is no output pulse of the AFS 13 within the period $T_R$, the period $T_R$ is the period $T_S$. At step 305, a calculation of $156 \cdot T_S/T_A$ is performed to convert the time difference $\Delta t$ into the output pulse data $\Delta P$ of the AFS 13. That is, the pulse data $\Delta P$ is calculated under an assumption that a preceding output pulse period of the AFS 13 is the same as a current output pulse period of the AFS 13. At step 306, the pulse data $\Delta P$ is compared with 156. When it is smaller than 156, the operation is shifted to step 308 and, when larger than 156, the data ΔP is clipped to 156 at step 307.

At step 308, the remaining pulse data $P_D$ is subtracted by the pulse data ΔP to update the remaining pulse data. At step 309, it is checked whether the updated data $P_D$ is negative. If it is positive, the operation is shifted to step 312A and, if negative, the pulse data ΔP is made equal to $P_D$ in step 310 since the calculated pulse data ΔP is much larger than the output pulse of the AFS 13 and then the remaining pulse data is cleared at step 312. If it is decided at step 312A that the frequency division flag is set, the data ΔP is doubled at step 312B and the operation is shifted to step 313. If the flag is reset, the operation is shifted to step 313A, directly.

At step 313, a sum of the accumulated pulse data $P_R$ and the pulse data ΔP is obtained which is a new accumulated pulse data $P_R$. The latter data corresponds to the number of pulses to be considered as being outputted by the AFS 13 during a current period between a preceding leading edge and a current leading edge of pulses from the crank angle sensor 17.

At step 314, a calculation of the equation (1) is performed. That is, the calculation of $K_1 \cdot AN + K_2 \cdot P_R$ is performed where AN and $P_R$ are a load data and a pulse data up to the leading edge of the preceding output of the crank angle sensor 17, respectively, and a result thereof is set as a new load data AN. The new load data AN is checked at step 315 whether or not it is larger than a predetermined value α. If yes, it is clipped to the value α at step 316 so that the load data AN can not be larger than an actual value even when the engine 1 is operating with the throttle being fully opened. At step 317, the accumulated pulse data $P_R$ is cleared. Then, it is checked at step 318 whether the SGC signal (cylinder recognition signal) is high or low. When it is low, the content of the cylinder counter is made +1 at step 319 and, when it is high, the cylinder counter is cleared at step 320 since the SGC signal is always high during compression stroke of the cylinder No. 1.

At step 321, it is checked whether the starter switch 19 is turned on. If yes indicating that the engine is just started, the drive time data, i.e., the pulse width $T_C$ is determined from the water temperature data WT at step 322 and, if no, the drive time data $T_1 = AN \cdot K_1 + T_D$ is calculated at step 323. When $T_C$ is not less than 50 m sec., $T_C$ is divided by 4 at step 325 to provide a new $T_C$ and then a calculation $T_1 = T_C + T_D$ is performed at step 326 and, thereafter, all of the four fuel injectors 14 are driven simultaneously at step 327.

When $T_C$ is less than 50 m sec., a calculation of $T_1 = T_C + T_D$ is performed at step 328.

After the step 323 or 328, it is checked at step 329 whether or not the content of the cylinder counter is 0. If yes, the fuel injector 14 for the cylinder No. 4 is driven at step 333. If no, then it is checked at step 330 whether or not the content of the cylinder counter is 1. If yes, the fuel injector 14 for the cylinder No. 3 is driven at step 334 and, if no, it is checked at step 331 whether or not the content of the cylinder counter is 2. If yes, the fuel injector 14 for the cylinder No. 2 is driven at step 335 and, if no, the cylinder No. 1 is driven at step 332.

Figure 3:
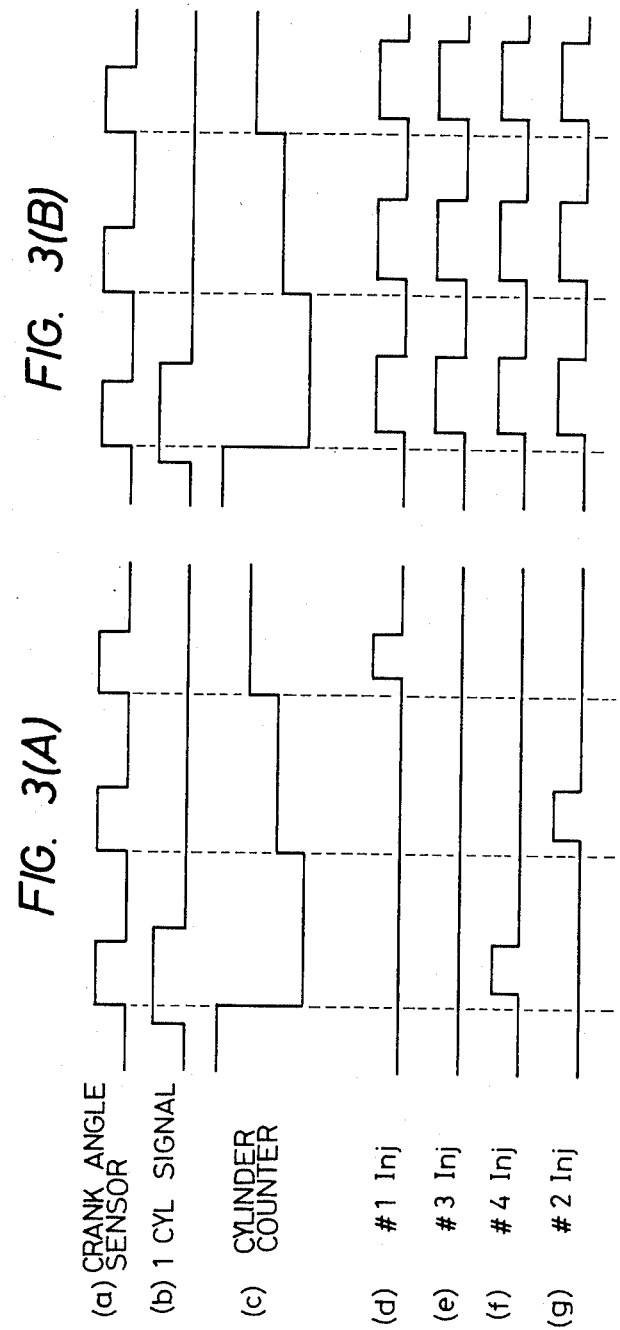
FIGS. 3A and 3B show operating waveforms at various points of the device in FIG. 1.

Since the driver pulse width $T_C$ is large at the starting of the engine at low temperature, the drive pulse width $T_C$ is divided by 4 with which all of the fuel injectors 14 are driven. In this case, each fuel injector 14 is driven several times for each air-intake as shown in FIG. 3B (the respective fuel injectors are driven once at predetermined crank angles for each air-intake usually). In FIGS. 3A and 3B, waveforms a, b, c and d to g correspond to the SGT signal of the crank angle sensor 17, the SGC signal, the output of the cylinder counter and drive pulses for the fuel injectors, respectively. When the temperature of the coolant at the engine start time is relatively high or when it is out of the engine start time, the respective fuel injectors 14 are sequentially driven as shown in FIG. 3A.

FIG. 8 is a timing chart showing timings of clearing the frequency division flags in the processings shown in FIGS. 4, 6, 7A and 7B, in which a, b, c and d are the output of the frequency divider 31, the SGT output of the crank angle sensor 17, the remaining pulse data $P_D$ and the variation of the accumulated pulse data $P_R$, respectively. The remaining pulse data $P_D$ is set to 156 every leading edge and trailing edge which corresponds to the leading edge of the output pulse of the AFS 13 of the frequency divider 31 and updated every leading edge of the output of the crank angle sensor 17 to, for example, $P_{Di} = P_d - 156 \cdot T_s / T_a$. This corresponds to the processings to be performed through the steps 305 to 312. The variation d of the accumulated pulse data $P_R$ shows the accumulation of the remaining pulse data $P_D$ at every leading or trailing edge of the output of the frequency divider 31.

As mentioned hereinbefore, according to the present invention, when the width of the drive pulse for the fuel injectors is large in such case as the engine start time where the engine revolution is low, the respective fuel injectors are driven plural times for each air-intake with narrower drive pulses. Therefore, it is possible to reduce the number of bits required for the timer of the control device and thus it is possible to reduce a manufacturing cost of the latter. Further, with the fact that the fuel injectors are driven several times for each air-intake which requires to drive the injectors prior to the air-intake, it is possible to improve the air-fuel mixture.

What is claimed is:

1. In a fuel control device for an internal combustion engine, including an intake air detecting means for detecting an amount of intake-air and control means for supplying drive pulse signals to fuel injectors for respective cylinders of said engine sequentially, said drive pulse signals having width corresponding to an output of said intake air detecting means, an improvement comprising means responsive to said drive pulses having width larger than a predetermined value for driving each of said fuel injectors several times for each air-intake with drive pulses having narrower width.

2. The improvement as claimed in claim 1, wherein said means responsive to said drive pulses is actuated only when said engine is in a starting stage.

* * * * *